(12) United States Patent
Zhang et al.

(10) Patent No.: US 11,809,283 B1
(45) Date of Patent: Nov. 7, 2023

(54) METHOD, ELECTRONIC DEVICE, AND COMPUTER PROGRAM PRODUCT FOR DELETING BACKUP DATA

(71) Applicant: DELL PRODUCTS L.P., Round Rock, TX (US)

(72) Inventors: Zengjie Zhang, Shanghai (CN); Jinru Yan, Shanghai (CN); Yudai Wang, Shanghai (CN); Kai Ji, Shanghai (CN); Zheyi Zhu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/827,461

(22) Filed: May 27, 2022

(30) Foreign Application Priority Data

Apr. 21, 2022 (CN) .......................... 202210423402.7

(51) Int. Cl.
*G06F 11/00* (2006.01)
*G06F 11/14* (2006.01)
*G06F 11/07* (2006.01)
*G06F 3/06* (2006.01)

(52) U.S. Cl.
CPC ........ *G06F 11/1464* (2013.01); *G06F 3/0608* (2013.01); *G06F 3/0652* (2013.01); *G06F 11/076* (2013.01); *G06F 11/0757* (2013.01); *G06F 11/0772* (2013.01); *G06F 11/1451* (2013.01); *G06F 11/1469* (2013.01)

(58) Field of Classification Search
CPC .............. G06F 11/0754; G06F 11/076; G06F 11/1461; G06F 16/162; G06F 3/0652; G06F 3/0649; G06F 3/0608
See application file for complete search history.

(56) References Cited

U.S. PATENT DOCUMENTS

| | | | | |
|---|---|---|---|---|
| 8,364,918 B1* | 1/2013 | Smith | ................. | G06F 11/3419 |
| | | | | 711/159 |
| 2008/0263293 A1* | 10/2008 | Kishi | .................... | G06F 3/0623 |
| | | | | 711/159 |
| 2016/0350214 A1* | 12/2016 | Payer | .................... | G06F 16/289 |
| 2021/0044504 A1* | 2/2021 | Verma | ................. | G06F 11/3006 |

\* cited by examiner

*Primary Examiner* — Marc Duncan
(74) *Attorney, Agent, or Firm* — WOMBLE BOND DICKINSON (US) LLP (57) ABSTRACT

Embodiments of the present disclosure provide a method, an electronic device, and a computer program product for deleting backup data. The method includes determining a set of non-backup time periods for an object based on a set of backup time periods for the object. The method further includes selecting a subset of non-backup time periods from the set of non-backup time periods on the basis of a time length. The method further includes deleting backup data of the object in the subset of non-backup time periods. By the embodiments of the present disclosure, a suitable time period can be selected, and unnecessary backup data is effectively deleted from the selected time period, thus improving the success rate of deletion of backup data.

20 Claims, 5 Drawing Sheets

```
400
 │
 ▼
┌──────────────────────────────────────────────────┐
│ Determine a set of non-backup time periods for   │ 402
│ an object on the basis of a set of backup time   │
│ periods for the object                           │
└──────────────────────────────────────────────────┘
 │
 ▼
┌──────────────────────────────────────────────────┐
│ Select a subset of non-backup time periods from  │ 404
│ the set of non-backup time periods on the basis  │
│ of a time length                                 │
└──────────────────────────────────────────────────┘
 │
 ▼
┌──────────────────────────────────────────────────┐
│ Delete backup data of the object in the subset   │ 406
│ of non-backup time periods                       │
└──────────────────────────────────────────────────┘
```

METHOD, ELECTRONIC DEVICE, AND COMPUTER PROGRAM PRODUCT FOR DELETING BACKUP DATA

CROSS-REFERENCE TO RELATED APPLICATION

This patent application claims priority, under 35 U.S.C. § 119, of Chinese Patent Application No. 202210423402.7, filed Apr. 21, 2022, which is incorporated by reference in its entirety.

TECHNICAL FIELD

Embodiments of the present disclosure relate to the field of computers, and more particularly, to a method, an electronic device, and a computer program product for deleting backup data.

BACKGROUND

With the development of data storage and protection technologies, more and more data can be stored in data protection products. Data of a protected object can be backed up and stored on different storage apparatuses (e.g., storage clouds), so as to improve security. However, as time goes by, the complexity of storage apparatuses and communication network systems has also increased, and the unfavorable factors that lead to the failure in deletion of backup data have also increased. Therefore, in existing data protection products, it is likely that the deletion of backup data will still be unsuccessful after many attempts. Therefore, an efficient method for deleting backup data is urgently needed.

SUMMARY OF THE INVENTION

Embodiments of the present disclosure provide a method, an electronic device, and a computer program product for deleting backup data.

According to a first aspect of the present disclosure, a method for deleting backup data is provided. The method includes determining a set of non-backup time periods for an object based on a set of backup time periods for the object. The method further includes selecting a subset of non-backup time periods from the set of non-backup time periods on the basis of a time length. The method further includes deleting backup data of the object in the subset of non-backup time periods.

According to a second aspect of the present disclosure, an electronic device is also provided. The electronic device includes a processor and a memory coupled to the processor. The memory has instructions stored therein which, when executed by the processor, cause the device to perform actions. The actions include determining a set of non-backup time periods for an object based on a set of backup time periods for the object. The actions further include selecting a subset of non-backup time periods from the set of non-backup time periods on the basis of a time length. The actions further include deleting backup data of the object in the subset of non-backup time periods.

According to a third aspect of the present disclosure, a computer program product is provided. The computer program product is tangibly stored on a computer-readable medium and includes machine-executable instructions, where the machine-executable instructions, when executed by a device, cause the device to execute the method according to the first aspect of the present disclosure.

The Summary of the Invention part is provided to introduce the selection of concepts in a simplified form, which will be further described in the Detailed Description below. The Summary of the Invention part is neither intended to identify key features or main features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

In all the accompanying drawings, identical or similar reference numerals indicate identical or similar elements.

DETAILED DESCRIPTION

The embodiments of the present disclosure will be described in more detail below with reference to the accompanying drawings. Although the drawings show some embodiments of the present disclosure, it should be understood that the present disclosure can be implemented in various forms, and should not be interpreted as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

The inventors have noticed that in a data protection product, data of a stored object can be backed up in different storage apparatuses. Many factors such as the complexity of the storage apparatus, the diversity of users, the computing system running the data protection product, and the communication network may adversely affect data deletion. This may result in a bad user experience, such as failed data deletion, the waste of storage apparatus space, the inability to automatically delete unnecessary backup data, and the user's repeated attempts to delete backup data.

In view of this, the present disclosure provides a method for deleting backup data. In this method, information related to backup time periods is used to select a suitable non-backup time period, and the deletion of backup data is attempted in the selected time period to improve the success rate of deleting backup data. In the method, after backup data deletion fails, another time period is selected to attempt to delete the backup data in the other time period. The method avoids deleting backup data in an unsuitable time period, thereby improving the success rate of deleting backup data.

Figure 1:
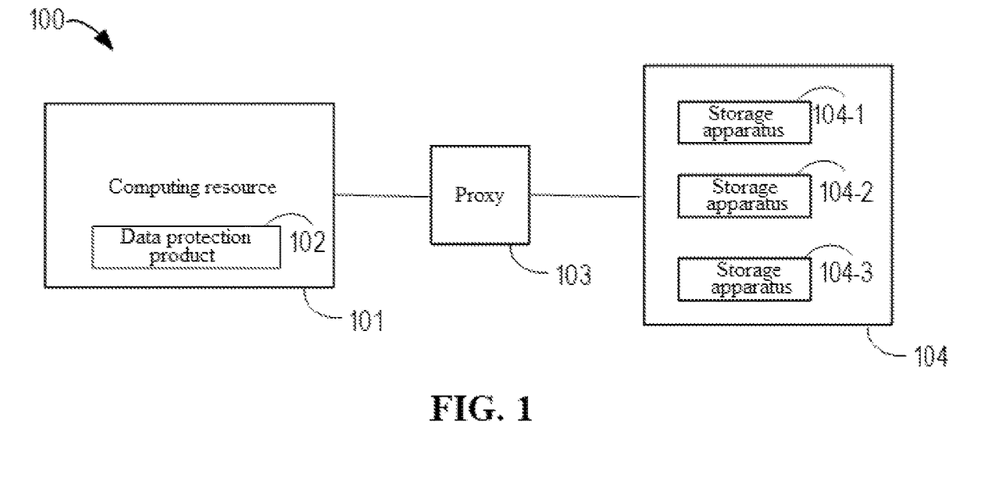
FIG. 1 schematically illustrates a schematic diagram of an example environment in which embodiments of the present disclosure can be implemented.

FIG. 1 illustrates a schematic diagram of example environment 100 in which embodiments of the present disclosure can be implemented.

In environment 100, computing resource 101 (e.g., a computing system or a server) has data protection product 102 installed thereon. Data protection product 102 is connected to storage apparatus 104 via proxy 103. Data of an object protected by the data protection product may be stored in a plurality of storage apparatuses 104-1, 104-2 . . . 104-N (referred to individually or collectively as storage apparatus 104).

Based on the importance of the object, the frequency of changes in the data of the object, and other factors, different backup frequencies can be set, and the data of the object can be backed up at these frequencies, such as backup once a day, once a week, etc. Old backups can be maintained or deleted as needed. Due to various adverse factors, backup data that needs to be deleted cannot be deleted, resulting in excessive occupation of the storage apparatuses.

Figure 2:
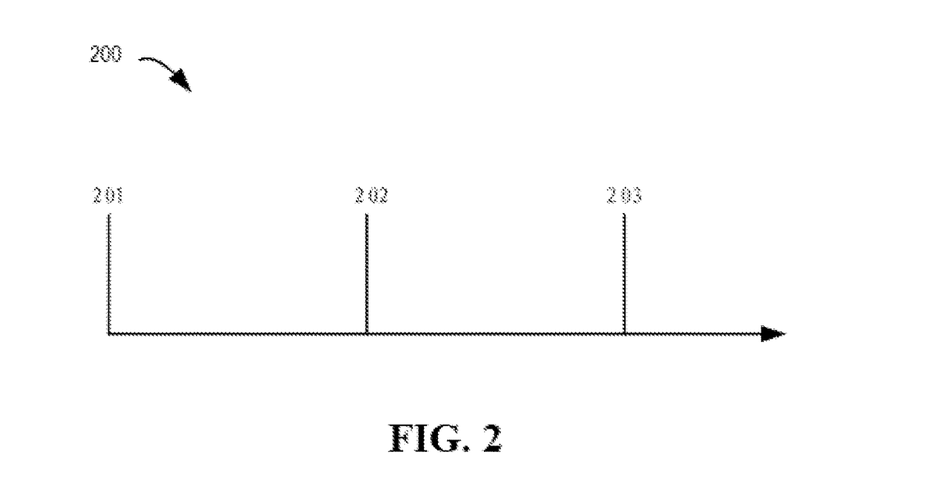
FIG. 2 schematically illustrates a schematic diagram of a method for deleting backup data according to a conventional solution.

FIG. 2 schematically illustrates a schematic diagram of method 200 for deleting backup data according to a conventional solution.

As shown in FIG. 2, in the conventional solution, a deletion operation for unnecessary backup data occurs at a predetermined time (e.g., time 201, time 202, and time 203). Predetermined times 201, 202, and 203 may be set by a user of the data protection product and is thus heavily dependent on the user's experience. For example, the user sets the time for deleting backup data to be 2:00 in the morning. The reason may be that the user thinks that this is a time when computing resources are relatively idle. However, due to the influence of factors such as different objects, different network environments, and different storage apparatuses, deletion of backup data at the predetermined time may not always succeed. In this way, after the deletion of the backup data at the fixed time fails, the unnecessary backup data occupies valuable storage space.

Figure 3:
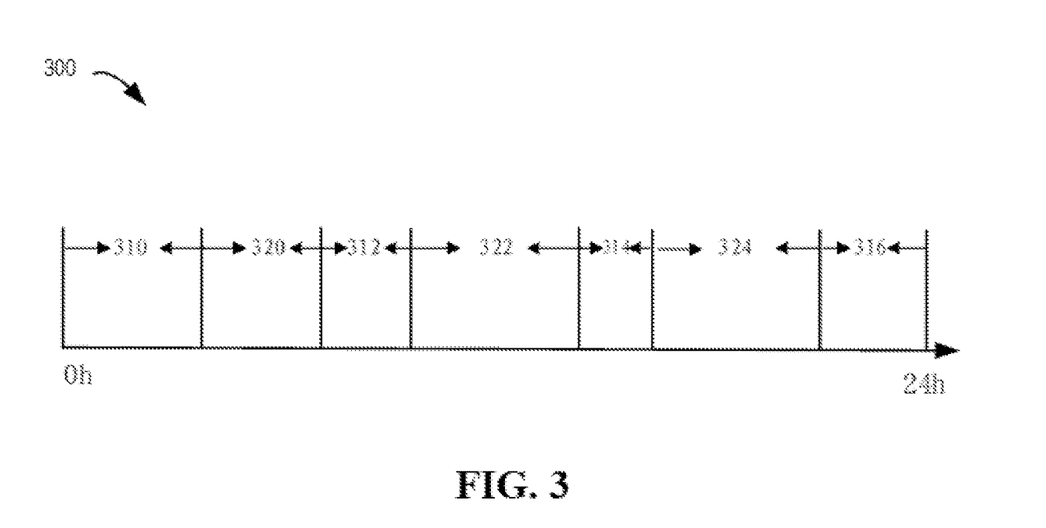
FIG. 3 schematically illustrates a schematic diagram of a backup time period and a non-backup time period according to an example implementation of the present disclosure.

FIG. 3 schematically illustrates a schematic diagram of a backup time period and a non-backup time period according to an example implementation of the present disclosure.

Taking one day as an example, data of an object may be set to be backed up during different time periods of the day, and these time periods may be referred to as backup time periods (e.g., backup time periods 310, 312, 314, and 316). In these backup time periods, the length of each time period can be different, and the data backed up can also be different. For example, the length of backup time period 310 is greater than that of backup time period 312. On the basis of these backup time periods, non-backup time periods (e.g., non-backup time periods 320, 322, and 324) for the object may be determined.

As an example, a time period between backup time period 310 and backup time period 312 may be determined as non-backup time period 320. In another example, a time period between backup time period 312 and backup time period 314 may be determined as non-backup time period 322. In yet another example, a time period between backup time period 316 and the first backup time period of the following day may be determined as a non-backup time period.

It can be known that there may be a plurality of non-backup time periods, and the non-backup time periods have the same or different lengths, depending on the lengths of the backup time periods.

Figure 4:
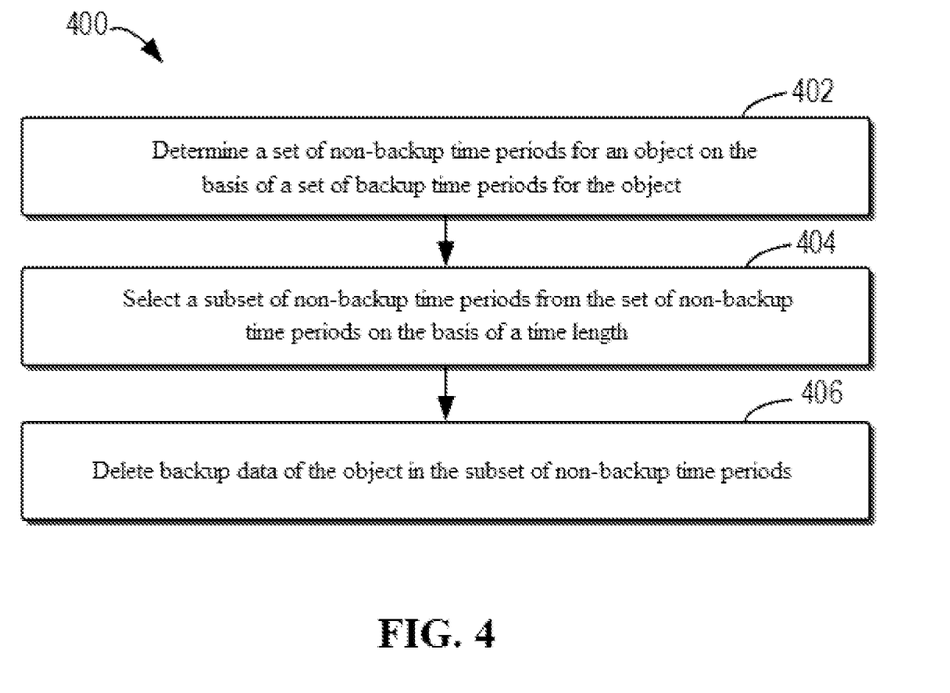
FIG. 4 schematically illustrates a flow chart of a method for deleting backup data according to an example implementation of the present disclosure.

FIG. 4 schematically illustrates a flow chart of method 400 for deleting backup data according to an example implementation of the present disclosure. Method 400 shown in FIG. 4 will be described below with reference to FIG. 3.

At block 402, a set of non-backup time periods for an object is determined on the basis of a set of backup time periods for the object.

As an example, non-backup time period 320 between backup time periods 310 and 312, non-backup time period 322 between backup time periods 312 and 314, and non-backup time period 324 between backup time periods 314 and 316 may be selected.

In some embodiments, in the set of backup time periods, data other than the backup data may be backed up. It can be understood that other data may include data of other objects, and may also include writing of any data occupying a storage apparatus.

In some embodiments, if the backup is completed in advance of a certain time period in the set of backup time periods, the length of time for the early completion may be added to the corresponding time period in the set of non-backup time periods. As an example, if backup time period 310 is N minutes, but data of objects that are backed up this time is not that much, and the actual backup (i.e., data writing) process is completed in only M (M being less than N) minutes, then the remaining N-M minutes may be counted in non-backup time period 310. In this way, the flexibility of determining the non-backup time period can be further improved, and the length of the non-backup time period can be increased.

At block 404, a subset of non-backup time periods is selected from the set of non-backup time periods on the basis of time length.

Time periods in the subset of non-backup time periods may be selected on the basis of a sequence associated with time length. A number of time periods with time lengths at the front of the sequence can be selected as the subset of non-backup time periods.

In some embodiments, the time periods in the set of non-backup time periods can be sorted on the basis of time length. As an example, these non-backup time periods can be sorted in descending order. As another example, the non-backup time periods can be sorted in ascending order. Thus, a sequence of the sorted non-backup time periods can be obtained. A threshold number of time periods can be selected as the subset of non-backup time periods on the basis of the sorting. As an example, if the threshold number is N, the N longest time periods from the sequence of the sorted non-backup time periods can be selected as the subset of non-backup time periods. Other computer-implemented methods may also be used to determine the subset of non-backup time periods, which is not limited in the present disclosure.

At block 406, the backup data of the object is deleted in the subset of non-backup time periods.

In some embodiments, the backup data can be sequentially deleted in each time period of the subset of non-backup time periods according to time sequence. Taking one day as an example, the backup data can be deleted sequentially according to the order of the subset of non-backup time periods on a time axis.

In some embodiments, a first time period can be selected from the subset of non-backup time periods, and the first time period may be the earliest time period in the subset of non-backup time periods. That is, it can be the time period ranked first on the time axis. The backup data is deleted in the selected first time period. As an example, non-backup time period 320 can be selected as the first time period because non-backup time period 320 is the time period ranked first on the time axis.

Figure 5:
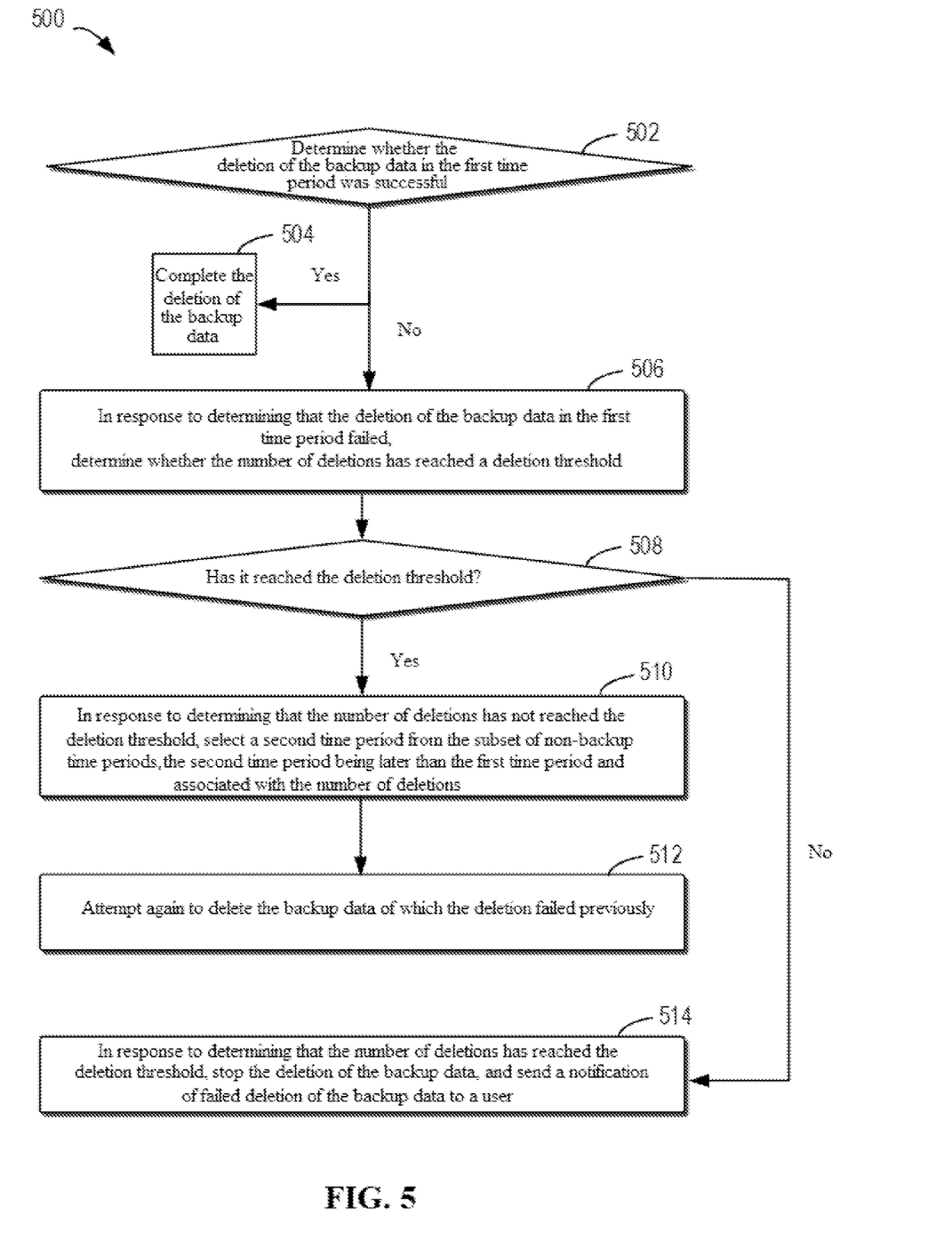
FIG. 5 schematically illustrates a flow chart of a method for attempting again to delete backup data according to an example implementation of the present disclosure.

Since the time periods in the subset of non-backup time periods have long time lengths, in which computing resources or storage apparatuses are relatively idle, the success rate of deleting backup data is relatively high. In some embodiments, method 500 after deletion of backup data fails is further provided, so as to attempt to delete the backup data multiple times to increase the overall success rate of backup data deletion.

FIG. 5 schematically illustrates a flow chart of method 500 for attempting again to delete backup data according to an example implementation of the present disclosure.

Based on method 400, at block 406, method 500 may be further performed to iteratively attempt to delete the backup data. Specifically, at block 502, it can be determined whether the deletion of the backup data in the first time period was successful. If the deletion of the backup data was successful, according to method 500, at block 504, the deletion of the backup data is completed.

At block 506, in response to determining that the deletion of the backup data in the first time period failed, at block 508, it can be determined whether the number of deletions has reached a deletion threshold.

As an example, if it has been determined that the deletion of the backup data in the first time period failed, the deletion may be attempted again in the following non-backup time period. However, the attempt needs to satisfy a constraint on the total number of deletions. By setting the constraint reasonably, excessive requests for computing resources can be avoided, and the user can be promptly notified that the backup data cannot be deleted. Therefore, a deletion threshold can be set, and another attempt to delete the backup data may be made as long as the number of deletions is within the deletion threshold. If the number of deletions exceeds the deletion threshold, continued attempts to delete the backup data cannot be made.

At block 510, in response to determining that the number of deletions has not reached the deletion threshold, a second time period can be selected from the subset of non-backup time periods, and the second time period can be later than the first time period and associated with the number of deletions. The backup data may be deleted in the second time period.

As an example, non-backup subset 322 is selected from the subset of non-backup time periods as the second time period. It can be seen that second time period 322 is immediately after first time period 320 and is the time period ranked second on the time axis. If the number of deletions can be incremented once after block 510 is performed, and if the incremented number of deletions has not reached the deletion threshold, the process returns to block 508 to determine whether the number of deletions has reached the deletion threshold. If the incremented number of deletions has reached the deletion threshold, the process continues on to block 512.

At block 512, deletion of the backup data for which deletion failed previously can be attempted again. Backup data deleted during a non-backup period may be backup data deleted with the first attempt, or backup data for which deletion has failed with a previous attempt.

At block 514, in response to determining that the number of deletions has reached the deletion threshold, the deletion of the backup data can be stopped. A notification of the failed deletion of the backup data is sent to a user.

Considering the possibility that the continued inability to delete backup data when the number of deletion attempts has reached the deletion threshold is caused by other factors such as hardware and network environment, attempts to delete the backup data can be stopped at this time, and the user can be promptly notified of the situation. In this way, the user is able to promptly check whether the failure is caused by other reasons.

Through the application of method 400 and method 500, another suitable time period can be selected after the first attempt to delete the backup data fails, and the backup data can be deleted in the other suitable time period. Differing from the conventional solution in which the backup data is only deleted once at fixed time, in method 500, deletion of the backup data may be attempted multiple times, thereby improving the success rate of backup data deletion and reducing the unnecessary occupation of storage apparatuses. In addition, after multiple deletion failures, the deletion of backup data will not be attempted endlessly; rather, deletion requests will be stopped after the number of deletions has reached the deletion threshold. In this way, the load on computing resources can be reduced, and the user can also be promptly notified in order to detect other possible causes.

Figure 6:
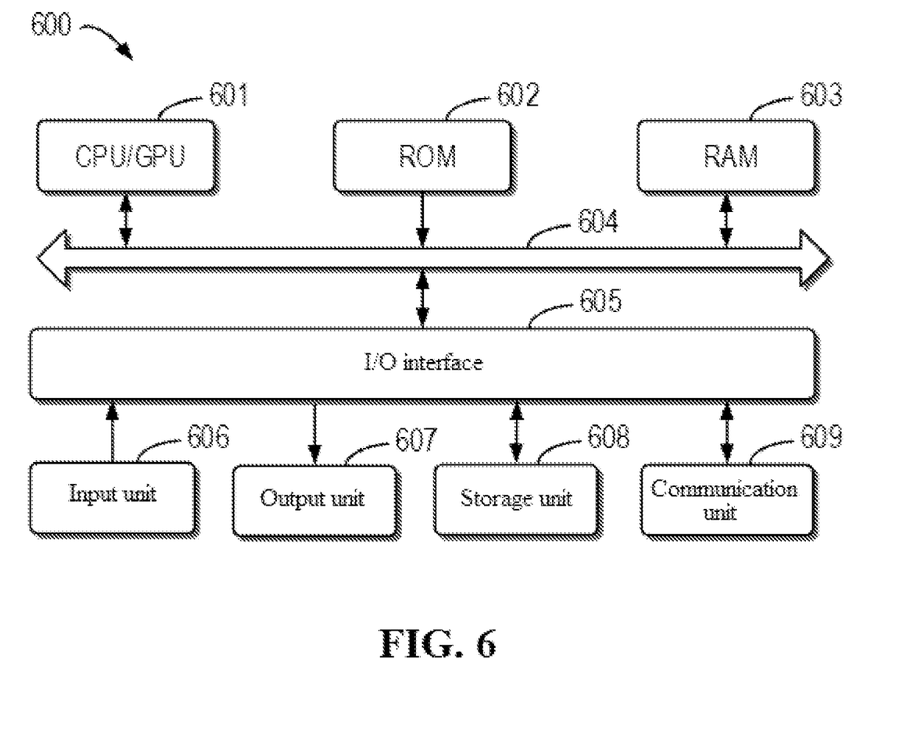
FIG. 6 schematically illustrates a block diagram of a device for deleting backup data according to an example implementation of the present disclosure.

FIG. 6 illustrates a schematic block diagram of device 600 that may be used to implement embodiments of the present disclosure. Device 600 may be a device or apparatus as described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604. Although not shown in FIG. 6, device 600 may also include a co-processor.

A plurality of components in device 600 are connected to I/O interface 605, including: input unit 606, such as a keyboard or a mouse; output unit 607, such as various types of displays and speakers; storage unit 608, such as a magnetic disk or an optical disc; and communication unit 609, such as a network card, a modem, or a wireless communication transceiver. Communication unit 609 allows device 600 to exchange information/data with other devices via a computer network, such as the Internet, and/or various telecommunication networks.

The various methods or processes described above may be performed by processing unit 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer programs are loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. When a remote computer is involved, the remote computer can be connected to a user computer through any kind of network, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing the status information of computer-readable program instructions. The electronic circuit may execute the computer-readable program instructions to implement various aspects of the present disclosure.

These computer-readable program instructions may be provided to the processing unit of a general-purpose computer, a special-purpose computer, or another programmable data processing apparatus, thereby producing a machine, such that these instructions, when executed by the processing unit of the computer or the other programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus, the computer-readable medium having instructions stored includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps may be performed on the computer, the other programmable data processing apparatus, or the other device to produce a computer-implemented process, such that the instructions executed on the computer, the other programmable data processing apparatus, or the other device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed basically concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

Some example implementations of the present disclosure are listed below.

In a first aspect of the present disclosure, a method for deleting backup data is provided. The method includes determining a set of non-backup time periods for an object based on a set of backup time periods for the object. The method further includes selecting a subset of non-backup time periods from the set of non-backup time periods on the basis of a time length. The method further includes deleting backup data of the object in the subset of non-backup time periods.

In some embodiments, the selecting a subset of non-backup time periods from the set of non-backup time periods on the basis of a time length includes: sorting the time periods in the set of non-backup time periods on the basis of the time length; selecting, on the basis of the sorting, a threshold number of time periods as the subset of non-backup time periods.

In some embodiments, the deleting backup data of the object in the subset of non-backup time periods includes: sequentially deleting the backup data in each time period of the subset of non-backup time periods according to a time sequence.

In some embodiments, the sequentially deleting the backup data in each time period of the subset of non-backup time periods according to a time sequence includes: selecting a first time period from the subset of non-backup time periods, the first time period being the time period that is the earliest in the subset of non-backup time periods; and deleting the backup data in the first time period.

In some embodiments, the sequentially deleting the backup data in each time period of the subset of non-backup time periods according to a time sequence includes: determining whether the deletion of the backup data in the first time period was successful; and in response to determining that the deletion of the backup data in the first time period failed, determining whether the number of deletions has reached a deletion threshold.

In some embodiments, the sequentially deleting the backup data in each time period of the subset of non-backup time periods according to a time sequence includes: in response to determining that the number of deletions has not reached the deletion threshold, selecting a second time period from the subset of non-backup time periods, the second time period being after the first time period and associated with the number of deletions; and deleting the backup data in the second time period.

In some embodiments, the method further includes: in response to determining that the number of deletions has reached the deletion threshold, stopping the deletion of the backup data; and sending a notification of the failed deletion of the backup data to a user.

In some embodiments, the deleting the backup data includes: attempting again to delete the backup data of which the deletion failed previously.

In some embodiments, the method further includes: backing up data other than the backup data in the set of backup time periods.

In some embodiments, the method further includes: if the backup is completed in advance of a certain time period in the set of backup time periods, adding the length of time for the early completion to a corresponding time period in the set of non-backup time periods.

In a second aspect of the present disclosure, an electronic device is provided. The electronic device includes a processor and a memory that is coupled to the processor and has instructions stored therein. The instructions, when executed by the processor, cause the device to execute actions. The actions include determining a set of non-backup time periods for an object based on a set of backup time periods for the object. The actions further include selecting a subset of non-backup time periods from the set of non-backup time periods on the basis of a time length. The actions further include deleting backup data of the object in the subset of non-backup time periods.

In some embodiments, the selecting a subset of non-backup time periods from the set of non-backup time periods on the basis of a time length includes: sorting the time periods in the set of non-backup time periods on the basis of the time length; selecting, on the basis of the sorting, a threshold number of time periods as the subset of non-backup time periods.

In some embodiments, the deleting backup data of the object in the subset of non-backup time periods includes: sequentially deleting the backup data in each time period of the subset of non-backup time periods according to a time sequence.

In some embodiments, the sequentially deleting the backup data in each time period of the subset of non-backup time periods according to a time sequence includes: selecting a first time period from the subset of non-backup time periods, the first time period being the time period that is the earliest in the subset of non-backup time periods; and deleting the backup data in the first time period.

In some embodiments, the sequentially deleting the backup data in each time period of the subset of non-backup time periods according to a time sequence includes: determining whether the deletion of the backup data in the first time period was successful; and in response to determining that the deletion of the backup data in the first time period failed, determining whether the number of deletions has reached a deletion threshold.

In some embodiments, the sequentially deleting the backup data in each time period of the subset of non-backup time periods according to a time sequence includes: in response to determining that the number of deletions has not reached the deletion threshold, selecting a second time period from the subset of non-backup time periods, the second time period being after the first time period and associated with the number of deletions; and deleting the backup data in the second time period.

In some embodiments, the actions also include: in response to determining that the number of deletions has reached the deletion threshold, stopping the deletion of the backup data; and sending a notification of the failed deletion of the backup data to a user.

In some embodiments, the deleting the backup data includes attempting again to delete the backup data of which the deletion failed previously.

In some embodiments, the actions also include: backing up data other than the backup data in the set of backup time periods.

In some embodiments, the actions also include: if the backup is completed in advance of a certain time period in the set of backup time periods, adding the length of time for the early completion to a corresponding time period in the set of non-backup time periods.

In an embodiment of a third aspect, a computer program product is provided. The computer program product is tangibly stored on a computer-readable medium and includes computer-executable instructions that, when executed by a device, cause the device to perform the method of the first aspect.

Although the present disclosure has been described using language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method of deleting backup data, comprising:
   determining a set of non-backup time periods for an object based on a set of backup time periods for the object;
   selecting a subset of non-backup time periods from the set of non-backup time periods based on a time length; and
   deleting backup data of the object in the subset of non-backup time periods.

2. The method according to claim 1, wherein selecting a subset of non-backup time periods from the set of non-backup time periods based on a time length comprises:
   sorting the time periods in the set of non-backup time periods based on the time length; and
   selecting, based on the sorting, a threshold number of time periods as the subset of non-backup time periods.

3. The method according to claim 1, wherein deleting the backup data of the object in the subset of non-backup time periods comprises:
   sequentially deleting the backup data in each time period of the subset of non-backup time periods according to a time sequence.

4. The method according to claim 3, wherein sequentially deleting the backup data in each time period of the subset of non-backup time periods according to a time sequence comprises:
   selecting a first time period from the subset of non-backup time periods, the first time period being the earliest time period in the subset of non-backup time periods; and
   deleting the backup data in the first time period.

5. The method according to claim 4, wherein sequentially deleting the backup data in each time period of the subset of non-backup time periods according to a time sequence comprises:
   determining whether the deletion of the backup data in the first time period was successful; and
   in response to determining that the deletion of the backup data in the first time period failed, determining whether a number of deletions has reached a deletion threshold.

6. The method according to claim 5, wherein sequentially deleting the backup data in each time period of the subset of non-backup time periods according to a time sequence comprises:
   in response to determining that the number of deletions has not reached the deletion threshold, selecting a second time period from the subset of non-backup time periods, the second time period being after the first time period and associated with the number of deletions; and
   deleting the backup data in the second time period.

7. The method according to claim 5, further comprising:
   in response to determining that the number of deletions has reached the deletion threshold, stopping the deletion of the backup data; and
   sending a notification of the failed deletion of the backup data to a user.

8. The method according to claim 5, wherein deleting the backup data comprises:
   attempting again to delete the backup data of which the deletion failed previously.

9. The method according to claim 1, further comprising:
   backing up data other than the backup data in the set of backup time periods.

10. The method according to claim 9, further comprising:
    if the backup is completed in advance of a certain time period in the set of backup time periods, adding the length of time for early completion to a corresponding time period in the set of non-backup time periods.

11. An electronic device, comprising:
    a processor; and
    a memory coupled to the processor and having instructions stored therein, which when executed by the processor, cause the device to perform actions, the actions comprising:
    determining a set of non-backup time periods for an object based on a set of backup time periods for the object;
    selecting a subset of non-backup time periods from the set of non-backup time periods based on a time length; and
    deleting backup data of the object in the subset of non-backup time periods.

12. The electronic device according to claim 11, wherein selecting a subset of non-backup time periods from the set of non-backup time periods based on a time length comprises:
    sorting the time periods in the set of non-backup time periods based on the time length; and
    selecting, based on the sorting, a threshold number of time periods as the subset of non-backup time periods.

13. The electronic device according to claim 11, wherein deleting the backup data of the object in the subset of non-backup time periods comprises:
    sequentially deleting the backup data in each time period of the subset of non-backup time periods according to a time sequence.

14. The electronic device according to claim 13, wherein sequentially deleting the backup data in each time period of the subset of non-backup time periods according to a time sequence comprises:
    selecting a first time period from the subset of non-backup time periods, the first time period being the earliest in the subset of non-backup time periods; and
    deleting the backup data in the first time period.

15. The electronic device according to claim 14, wherein sequentially deleting the backup data in each time period of the subset of non-backup time periods according to a time sequence comprises:
    determining whether the deletion of the backup data in the first time period was successful; and
    in response to determining that the deletion of the backup data in the first time period failed, determining whether a number of deletions has reached a deletion threshold.

16. The electronic device according to claim 15, wherein sequentially deleting the backup data in each time period of the subset of non-backup time periods according to a time sequence comprises:
    in response to determining that the number of deletions has not reached the deletion threshold, selecting a second time period from the subset of non-backup time periods, the second time period being after the first time period and associated with the number of deletions; and deleting the backup data in the second time period.

17. The electronic device according to claim 15, wherein the actions further comprise:

in response to determining that the number of deletions has reached the deletion threshold, stopping the deletion of the backup data; and sending a notification of the failed deletion of the backup data to a user.

18. The electronic device according to claim 15, wherein deleting the backup data comprises:

attempting again to delete the backup data of which the deletion failed previously.

19. The electronic device according to claim 11, wherein the actions further comprise:

backing up data other than the backup data in the set of backup time periods.

20. A non-transitory machine-readable medium having instructions stored therein, which when executed by a processor, cause the processor to perform actions, the actions comprising:

determining a set of non-backup time periods for an object based on a set of backup time periods for the object;

selecting a subset of non-backup time periods from the set of non-backup time periods based on a time length; and deleting backup data of the object in the subset of non-backup time periods.

\* \* \* \* \*